(No Model.)
2 Sheets—Sheet 1.

E. KAUFFELD.
COMBINED MALT CUTTER AND VEGETABLE CRUSHER.

No. 320,877. Patented June 23, 1885.

WITNESSES
INVENTOR
Elias Kauffeld
By
Connolly Bros & McSiphe
ATTORNEYS (No Model.) 2 Sheets—Sheet 2.

E. KAUFFELD.
COMBINED MALT CUTTER AND VEGETABLE CRUSHER.

No. 320,877. Patented June 23, 1885.

WITNESSES:

INVENTOR
Elias Kauffeld
By
Connolly Brothers & Tyke
ATTORNEYS

United States Patent Office.

ELIAS KAUFFELD, OF PITTSBURG, PENNSYLVANIA, ASSIGNOR OF ONE-HALF TO THOMAS MILLER, OF SAME PLACE.

COMBINED MALT-CUTTER AND VEGETABLE-CRUSHER.

SPECIFICATION forming part of Letters Patent No. 320,877, dated June 23, 1885.

Application filed December 27, 1884. (No model.)

*To all whom it may concern:*

Be it known that I, ELIAS KAUFFELD, of Pittsburg, in the county of Allegheny and State of Pennsylvania, have invented certain new and useful Improvements in Combined Malt-Grinders and Vegetable-Crushers; and I do hereby declare that the following is a full, clear, and exact description of the invention, which will enable others skilled in the art to which it appertains to make and use the same, reference being had to the accompanying drawings, which form a part of this specification, in which—

Figure 1:
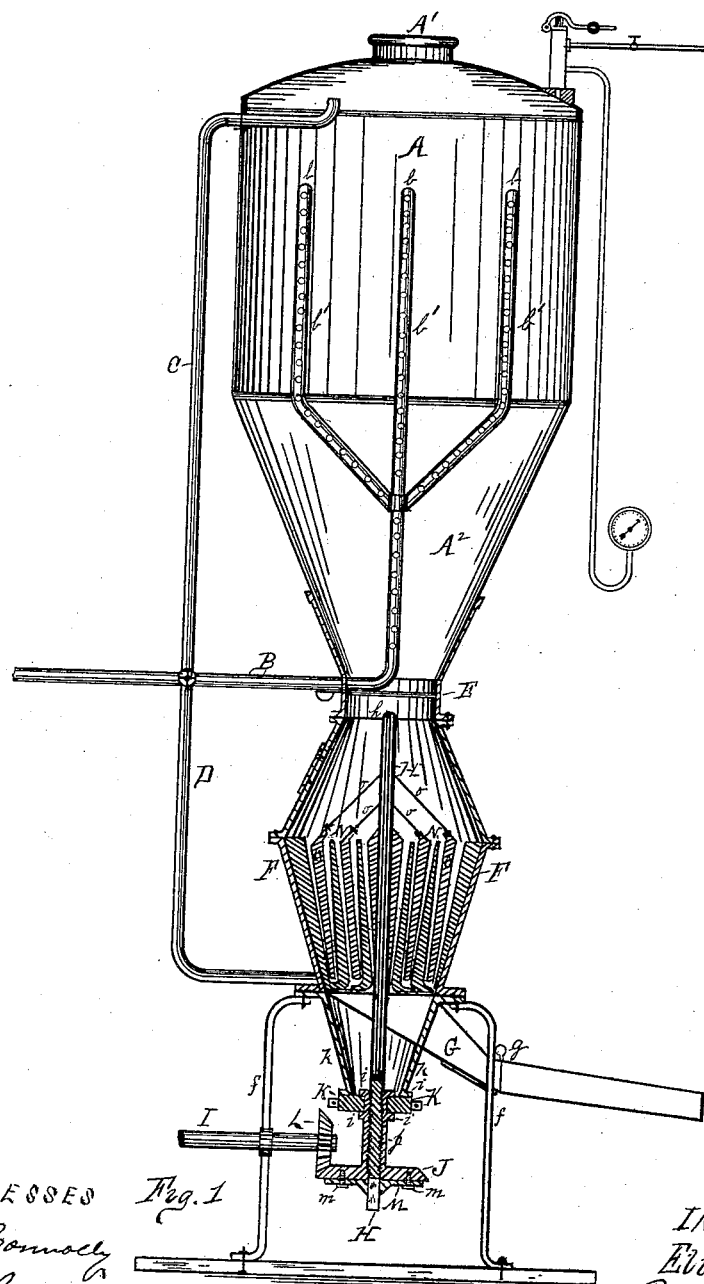
Figure 2:
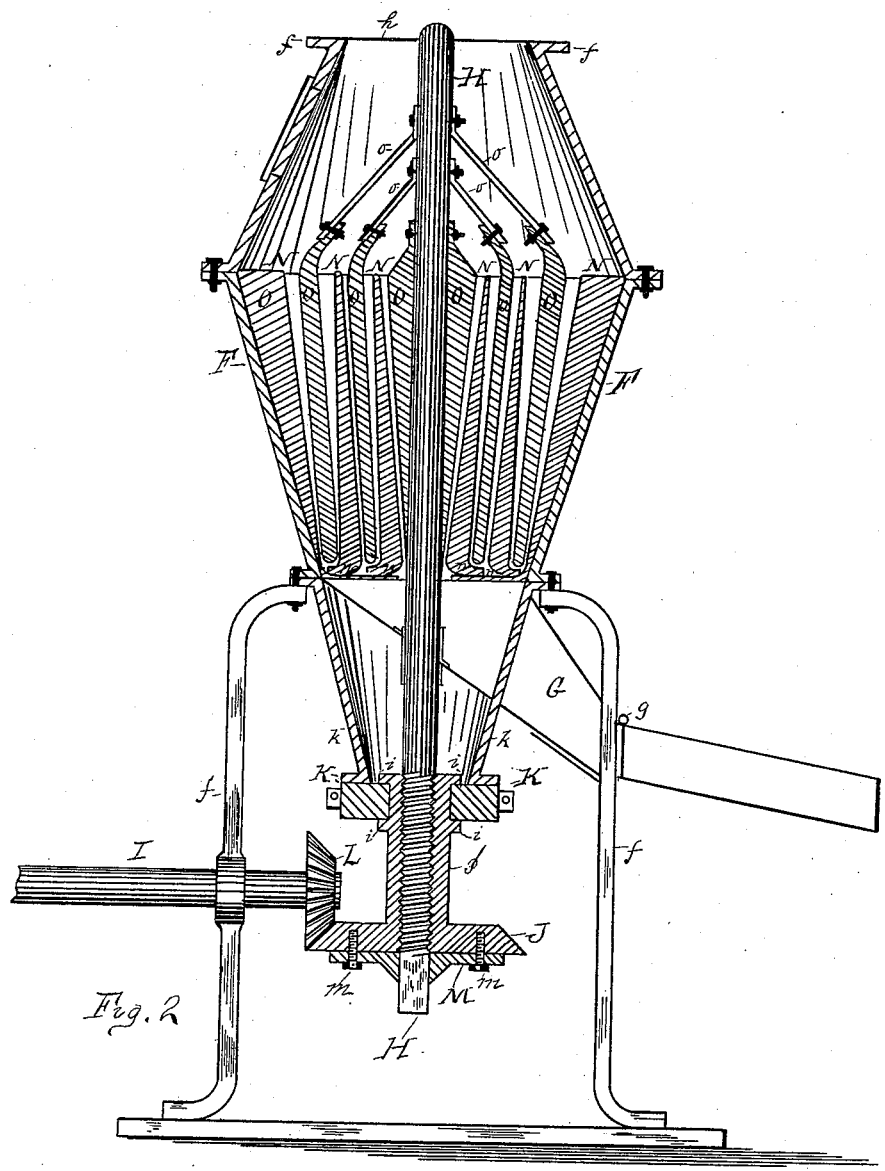

Figure 1 is a vertical central sectional view of the boiler, crusher, and regulator. Fig. 2 is a sectional view of the crusher and regulator.

My invention has relation to combined grain or malt grinders and vegetable-crushers for use in distilleries.

My invention has for its object the provision of a novel form and arrangement of apparatus whereby a single mill or grinding apparatus may be used alternately to crush vegetable materials in such manner as to reduce them to the pulpy condition necessary for mashing and to finely grind malt or grain for the same purpose.

My invention consists in the peculiar construction, combination, and arrangement of parts hereinafter fully described and specifically claimed.

In the preparation of vegetable substances for mash it is necessary to boil the vegetables, and for this purpose it is usual to employ a closed boiler into which projects suitable pipes, through which steam is introduced for the purpose of softening and boiling the vegetables. The vegetables, after this operation, are passed to a grinding apparatus, which reduces them to a pulpy condition. In addition to this grinding apparatus, it is usual to provide a separate mill for grinding malt or grain. My invention contemplates the combining of the boiler, the vegetable-crusher, and the malt-mill in a single apparatus, the two latter being combined in a single aggregation of parts, which are used alternately with a slight alteration in their relative positions accordingly as the apparatus is to be used for crushing vegetables or grinding malt or grain.

In the accompanying drawings wherein Fig. 1 is a vertical section of my improved apparatus, A designates the vegetable-boiler, comprising a cylindrical vessel having a tight top, A', and a funnel-like bottom, A". A pipe, B, enters the vessel A at its bottom, and is bent up to within a short distance of the top of the vessel, its upper end being formed into branches *b b b*, perforated at *b' b'* for the exit of the steam. Another pipe, C, branches off from the pipe B outside of the vessel A and enters the latter just beneath the top A'. A third pipe, D, also branches off from the pipe B and leads into the bottom of the grinding-mill, which is placed immediately below the vessel A. At the point of juncture the pipes B C D are provided with a three-way cock, by means of which the steam may be directed into one or other of the said pipes, as desired.

Beneath the vessel A, and connected to the lower end of its funnel-shaped bottom A", is arranged the grinding and crushing mill. A gate, E, between the vessel and the mill, serves to regulate the passage of the vegetable matter or malt, or to entirely cut off its flow, when desired.

F designates the exterior shell or case of the said mill, said casing being of a barrel-like formation—that is, wider at its middle than at either end. Legs *f f* serve to support the mill and the boiler to which it is attached and of which it forms a part. The interior surface of the lower half of the mill is roughened or burred, so as to assist in grinding the material passing therethrough. G designates a hopper leading from the bottom of the mill to the mash-tubs, and provided at *g* with a gate to facilitate the removal of the contents of the hopper when it is not desirable to lead the same to the mash-tubs.

H designates a shaft, which projects up into the mill, and is journaled at its upper end in a bracket, *h*. This shaft is supported by a gear-wheel, J, which in turn is journaled in a cross-bar, K, suspended from the bottom of the mill by hangers *k k*. A second gear-wheel, L, gears with the wheel J, its shaft, *l*, being journaled in the leg *f*. The gear-wheel J is provided with a sleeve, *j*, having at its upper end collars *i i*, and the cross-bar K is made in two separable sections, so as to embrace the sleeve J between the collars $i$ $i$, thereby allowing the sleeve and the gear-wheel J to turn freely. The shaft H passes through the sleeve $j$, being screw-threaded near its lower end, and the sleeve being also screw-threaded to receive the shaft. The lower end of the shaft H is squared, and fits into a square hole in the center of a plate, M, which is secured to the bottom of the gear-wheel J by screws $m$ $m$.

Within the mill F are secured two or more cone-shaped metallic shells N N, whose surfaces are serrated or roughened in a suitable manner. The shells N N are supported upon lugs $n$ $n$, extending out from the sides of the casing F.

O O designate a number of similar shells, which are attached to the shaft H by means of arms $o$ $o$, the surfaces of these shells being roughened or serrated in similar manner to the shells N N. The shells O O fit down between the shells N N, and the substance to be ground or crushed is passed down through the spaces between the shells, the lower set being stationary, and the upper set fixed to and revolving with shaft H.

The operation of my invention is as follows: When it is desired to crush vegetables, the shells N N and O are set a considerable distance apart, the method of adjusting the distance of the two sets of shells N N O O being as follows: The screws $m$ $m$ being taken out of the plate M, the latter is turned in one direction or the other and turns the shaft H, thereby screwing it up or down in the sleeve $j$, the gear-wheels J L remaining stationary, thus adjusting the distance between the shells N N O O. When the desired amount of adjustment has been secured, the screws $m$ $m$ are returned to their places, and the shaft now turns with the gear-wheel J.

When it is desired to grind grain or malt, the shells are set very close together, the top A' of the boiler is removed, and the gate E being opened and the steam turned off, the malt or grain is introduced into the boiler, which now serves merely as a hopper to contain the material to be ground.

Having described my invention, I claim—

1. In a grinding-mill, the combination, with the grinding-cones and with the beveled gearing through which motion is imparted to the same, one of said gears having an internally-threaded sleeve, of a screw-threaded shaft for communicating motion to the cones, and a detachable head or coupling rigidly connecting said shaft and gear, substantially as shown and described.

2. In a grain, malt, or vegetable mill, the combination of shells N N and O O with shaft H, screwing into the sleeve $j$ of gear-wheel J, its lower end being squared and fitting into a hole in plate M, secured to the bottom of said gear-wheel J, substantially as described, whereby the shaft may be vertically adjusted by turning said plate, as set forth.

In testimony that I claim the foregoing as my own I have hereto affixed my signature in presence of two witnesses.

ELIAS KAUFFELD.

Witnesses:
  C. L. STRAUB,
  A. A. MOORE.